(12) United States Patent
Fan et al.

(10) Patent No.: US 6,459,988 B1
(45) Date of Patent: Oct. 1, 2002

(54) METHOD AND SYSTEM FOR DETECTING VEHICLE COLLISION USING GLOBAL POSITIONING SYSTEM

(75) Inventors: Rodric C. Fan; Carey B. Fan, both of Fremont; David Mleczko, San Jose, all of CA (US)

(73) Assignee: At Road, Inc., Fremont, CA (US)

( * ) Notice: Subject to any disclaimer, the term of this patent is extended or adjusted under 35 U.S.C. 154(b) by 0 days.

(21) Appl. No.: 09/880,255

(22) Filed: Jun. 12, 2001

(51) Int. Cl.$^7$ .............................................. G01C 21/00
(52) U.S. Cl. ........................ 701/213; 701/301; 340/988
(58) Field of Search ................................. 701/200, 208, 701/211, 213, 301, 24, 45; 342/357.06, 357.09, 357.1, 357.13; 340/425.5, 436, 988

(56) References Cited

U.S. PATENT DOCUMENTS 5,969,598 A * 10/1999 Kimura ...................... 340/436
6,028,537 A * 2/2000 Suman et al. ............... 340/988

* cited by examiner

*Primary Examiner*—Yonel Beaulieu
(74) *Attorney, Agent, or Firm*—Edward C. Kwok; MacPherson Kwok Chen & Heid LLP (57) ABSTRACT

A method and a system using the Global Positioning System (GPS) to detect and report vehicle accidents are presented. GPS, which is currently used primarily for vehicle positioning, can be combined with wireless technology to automatically report accidents to third parties. A mobile unit placed or installed in a vehicle receives code sequences from the GPS satellites, converts the code sequences to positional information, and transmits the positional information to a server. The server derives the acceleration of the mobile unit from the positional information and compares the acceleration with a threshold value. In one embodiment, a microprocessor included in the mobile unit derives the acceleration and compares the acceleration with a threshold value. The threshold value represents acceleration that can be achieved only with an external force such as a collision. If the acceleration exceeds the threshold value, the server or the microprocessor automatically sends notification to third parties through the data network.

24 Claims, 7 Drawing Sheets

| mobile unit ID # | time | mobile unit position | mobile unit velocity | acceleration | threshold acceleration |
|---|---|---|---|---|---|
| 1 | | | | | |
| 2 | | | | | |
| ... | ... | ... | ... | ... | ... |
| ... | | | | | |
| n | | | | | |

FIG. 5

| mobile unit ID # | vehicle type | threshold acceleration | | |
|---|---|---|---|---|
| 1 | | | | |
| 2 | | | | |
| ... | | | | |
| n | | | | |

METHOD AND SYSTEM FOR DETECTING VEHICLE COLLISION USING GLOBAL POSITIONING SYSTEM

BACKGROUND

1. Field of Invention

The present invention relates a method and system for using the Global Positioning System and wireless communications technology to notify third parties of accidents.

2. Background of Invention

GPS is used to track vehicle positions. GPS includes a plurality of satellites orbiting the earth at a substantially constant speed and altitude. Each satellite transmits a code sequence that identifies the satellite and a GPS navigation message that is superimposed on the code sequence. Although the satellites are assigned frequencies at which they send their signals, Doppler effect prevents the signals from appearing exactly at the assigned frequencies. Thus, a GPS receiver often searches through a predefined range of frequencies to find the signal from the GPS satellites before tuning in to acquire the code sequence and the superimposed information. The superimposed information includes positional information (e.g., latitude, longitude, and altitude if necessary) and the time at which those positions were obtained. Further details on obtaining positional information from GPS satellites are provided in U.S. patent application Ser. No. 09/707326 to Fan et al. entitled "System and Method for Distribution of GPS Satellite Information," and in U.S. Pat. No. 5,959,577 to Fan et al. entitled "Method and Structure for Distribution of Travel Information Using Network." Both of the cited references are herein incorporated by reference.

Currently, the use of GPS is limited to tracking vehicle positions. Although vehicle safety is a concern for many people, GPS is not used as a tool for enhancing vehicle safety. Most reliable vehicle safety features today, such as seatbelts, air bags, and impact resistant bumpers, reduce the harm occupants might suffer as a result of a collision. However, the vehicle safety features available today do not focus on providing prompt notification of accidents to third parties. Once a collision occurs, prompt notification of third parties is desirable for accurate recording of the details of the collision and for calling for necessary medical care. The vehicle occupants may not be able to notify third parties due to a severe injury, and bystanders might not call for help. Therefore, a system that automatically and promptly notifies third parties of accidents is needed.

SUMMARY

The present invention provides a method and a system using the Global Positioning System (GPS) to detect and report vehicle accidents. A mobile unit that can be placed or installed in a vehicle receives code sequences from the GPS satellites and converts the code sequences to positional information. The mobile unit transmits the positional information to a server at regular time intervals using a data network. The server derives the acceleration of said mobile unit based on the positional information and compares the absolute value of the derived acceleration with a threshold value.

The threshold value represents the maximum rate of acceleration that can be achieved by normal driving actions, such as braking or speeding up. A derived acceleration value greater than the threshold value indicates that an external factor, such as a collision, is involved. Thus, upon detecting an acceleration value that exceeds the threshold value, the server automatically sends an accident notification to third parties through the data network. The notification may include, for example, the map of the area surrounding the accident site, air bag deployment status, seatbelt status, and the speed at which the vehicle was traveling at the time of the accident.

DETAILED DESCRIPTION OF THE INVENTION

Figure 1:
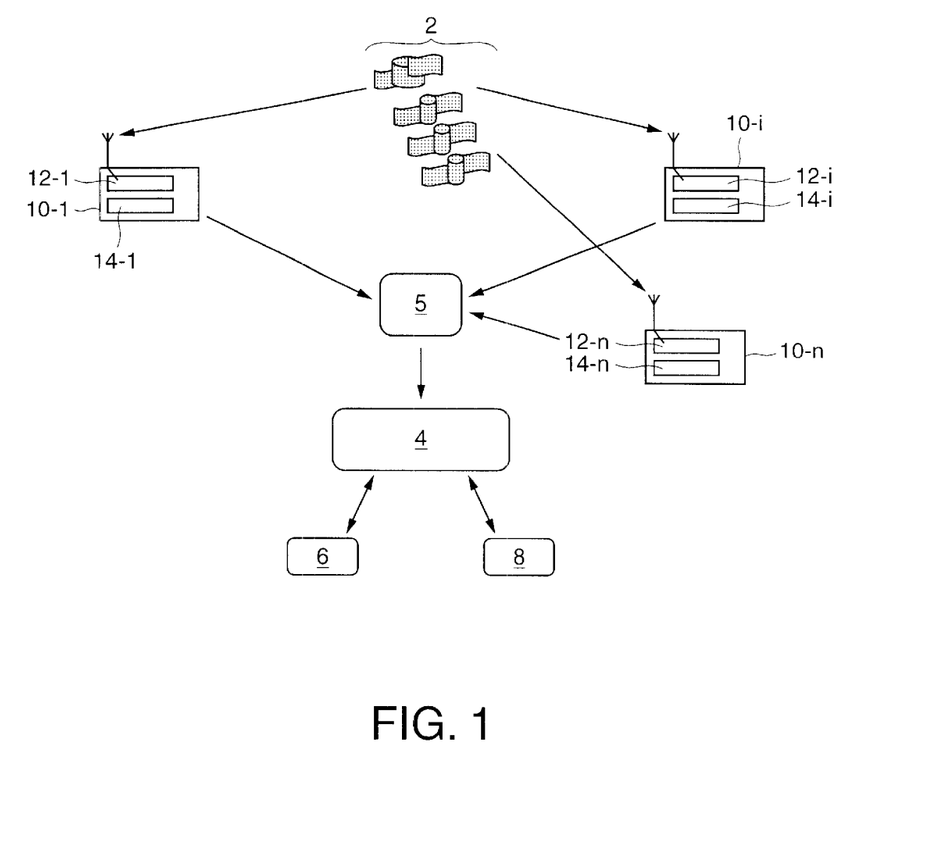
FIG. 1 illustrates a vehicle tracking system that utilizes GPS and a data network according to the present invention.

FIG. 1 illustrates a vehicle locating system that utilizes GPS and a data network. The system shown in FIG. 1 includes GPS satellite constellation 2, data network 4, server 6, monitor unit 8, and mobile units 10-1 through 10-n, n being the number of mobile units having the present invention. Each of mobile units 10-1 through 10-n includes GPS receiver 12-1 through 12-n, respectively, and network transmitter 14-1 through 14-n, respectively. Optionally, mobile unit may also include a network receiver (not shown) through which it can receive information from data network 4. As used herein, mobile unit 10-i refers to one of mobile units 10-1 through 10-n. Also, as used herein, GPS receiver 12-i and network transmitter 14-i each refer to the GPS receiver and the network transmitter that is included in the arbitrary mobile unit 10-i.

Mobile unit 10-i, which can be placed or installed in a vehicle, receives positional data from GPS satellites 2 and forwards the data to data network 4. GPS receiver 12-i of mobile unit 10-i tunes into the satellite signal frequency and receives code sequences and the corresponding times from satellite constellation 2. In some embodiments, mobile unit 10-i converts the code sequences into pseudo-range information, either through GPS receiver 12-i or through a separate microprocessor (not shown). Network transmitter 14-i then sends the code sequences or the pseudo-range information and the corresponding time to link 5. Link 5, which forwards the information to data network 4, may include but is not limited to a satellite link, a wireless network service station such as a CDPD or CDMA station, a small message service, or a conventional data and voice switching network. Network transmitter 14-i may automatically transmit information to data network 4 at a given time interval, or transmit information upon being triggered by a command entered through mobile unit 10-i or monitor unit 8.

Figure 2:
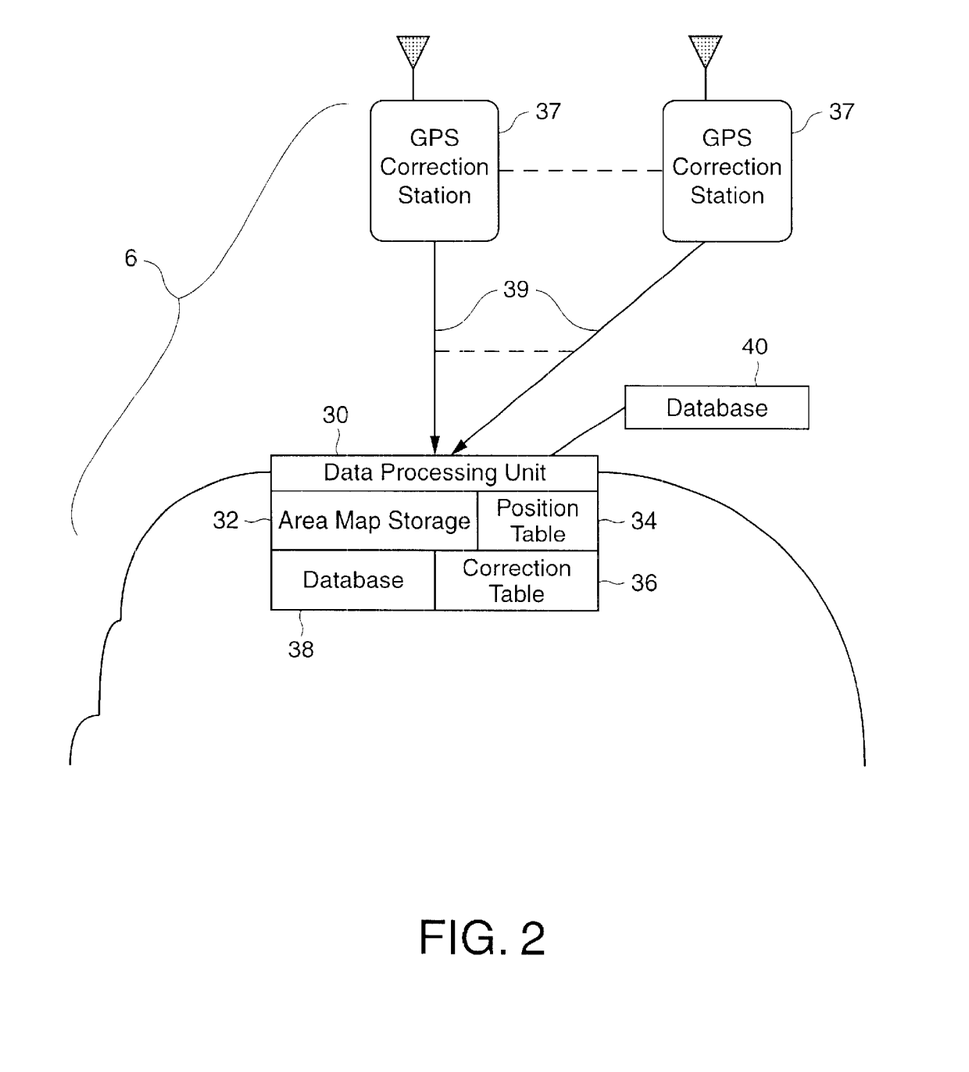
FIG. 2 illustrates a server included in the vehicle tracking system of the present invention.

Data network 4 may be, for example, the Internet or a telephone network. Once the information has been transmitted to data network 4, server 6 and monitor unit 8 may retrieve the information from data network 4. FIG. 2 shows the components of server 6. As shown in FIG. 2, server 6 includes data processing unit 30, area map storage 32, position table 34, and correction table 36. Correction table 36 may contain correction factors or delta-pseudo-range data depending on the method server 6 uses to obtain the actual positions and velocities of mobile units 10-1 through 10-n. The correction data and the delta-pseudo-range data, which are obtained from correction stations 37, are correction factors for the geographical zone in which mobile unit 10-i is located. Data processing unit 30 can connect to remote correction stations 37 via wired or wireless communication links, or via a data network 39 such as the Internet. Using the correction factors received from correction stations 37 and either the code sequences or the pseudo-ranges received from mobile unit 10-i, data processing unit 30 of server 6 computes the actual positions and velocities of mobile units 10-1 through 10-n. In one embodiment, GPS receiver 124 performs the conversion from pseudo-ranges to actual positions. In that embodiment, network transmitter 14-i sends the actual positions to server 6 via data network 4, and server 6 simply stores the actual positions in position table 34.

Figure 3:
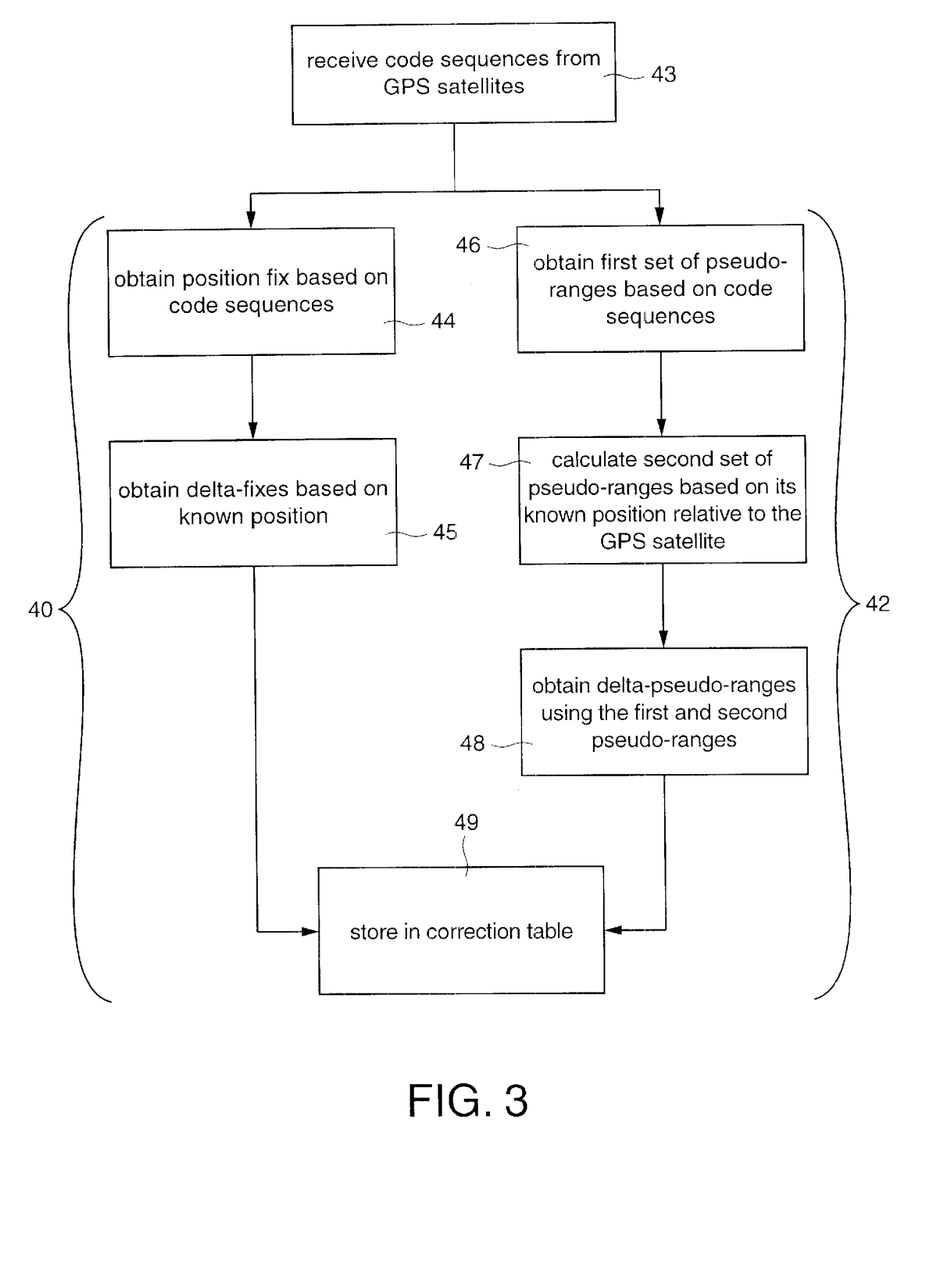
FIG. 3 illustrates the logic flow of two different correction methods that can be used in the present invention.

FIG. 3 shows two methods by which code sequences can be converted to actual positions: correction factor method 40 and delta-pseudo-range method 42. When using the correction factor method 40, one of the correction stations 37 receive the code sequences from GPS satellites and obtains a measured position (latitude and longitude) of itself based on the received code sequences (step 44). The measured position, herein referred to as "fix," is compared to the precisely known position of correction station 37 to obtain a positional correction factor for the longitude, herein referred to as delta-longitude, and a positional correction factor for the latitude, herein referred to as delta-latitude. Delta-longitude and delta-latitude, together referred to as delta-fixes, are stored in correction table 36. The delta-fixes are applied to correct the measured position of mobile unit 10-i to obtain the actual position of mobile unit 10-i.

When using delta-pseudo-range method 42, one of correction stations 37 receives code sequences from the GPS satellites 43 just as in correction factor method 40. However, instead of obtaining the position fix as in correction factor method 40, one of correction stations 37 calculates a first set of pseudo-ranges based on the code sequences 46. The correction station also calculates a second set of pseudo-ranges 47 based on its position and the relative positions of GPS satellites 2. Delta-pseudo-ranges are computed in step 48 using the two sets of pseudo-ranges and stored in correction table 36.

Using the delta-pseudo-ranges or the delta-fixes stored in correction table 36, data processing unit 30 of server 6 computes the actual positions of mobile units 10-1 through 10-n. The computed positions are stored in position table 34, to be accessed by data processing unit 30 for deriving the acceleration values of mobile units 10-1 through 10-n. Acceleration value, as used herein, refers to the absolute value of acceleration. Acceleration of mobile unit 10-i may be positive or negative depending on the direction of the collision. For example, when the collision is a head-on collision, the acceleration is negative. On the other hand, when the collision is a rear-ending accident that pushes mobile unit 10-i forward, the acceleration is positive. When an acceleration value of a mobile unit is compared to a threshold value, it is herein implied that both values are discussed in terms of absolute value.

Figure 4:
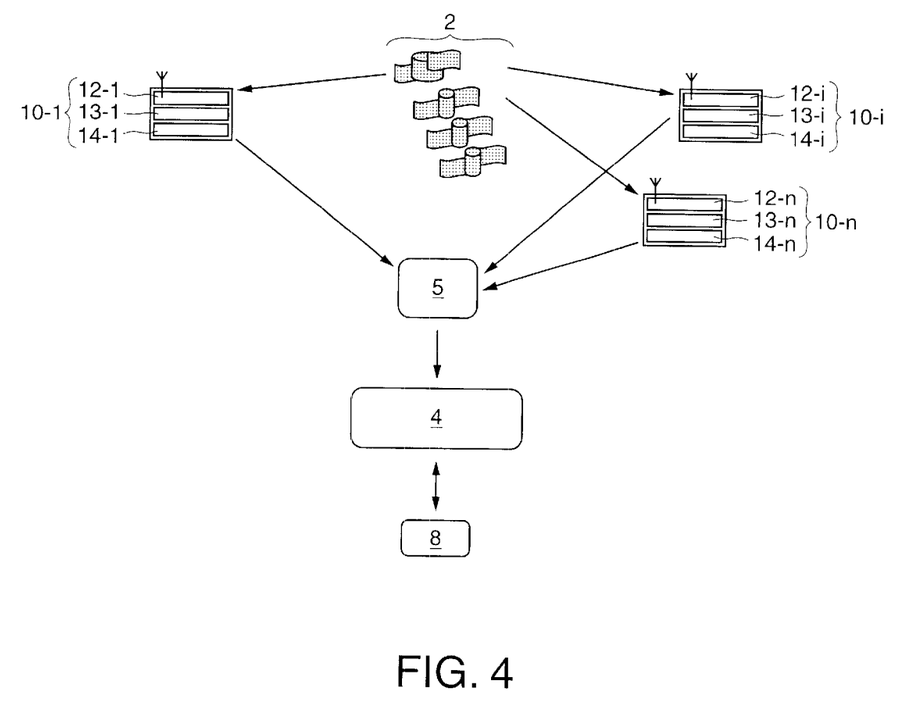
FIG. 4 illustrates one embodiment of a vehicle tracking system in accordance with the present invention.

FIG. 4 shows another embodiment of the present invention. In the embodiment shown in FIG. 4, mobile unit 10-i includes microprocessor 13-i in addition to GPS receiver 12-i and network transmitter 14-i. Microprocessor 13-i, which carries out substantially the same functions as server 6 of the embodiment in FIG. 1, derives the acceleration value of mobile unit 10-i at a predetermined time interval and compares the acceleration value with the threshold value for 10-i. Microprocessor 13-i may include a memory space for storing the data for a given period of time and a map storage. When the acceleration value exceeds the threshold value, network transmitter 14-i sends a notification to monitor unit 8 through data network 4. There is no server 6 in the embodiment of FIG. 4 because all the functions of server 6 is carried out internally by mobile unit 10-i. Optionally, the time interval between successive updates may be reduced after the detection of an acceleration value greater than the threshold value. The shortened time interval at the time of abnormal acceleration provides more data points for a subsequent accident analysis.

Figure 5:
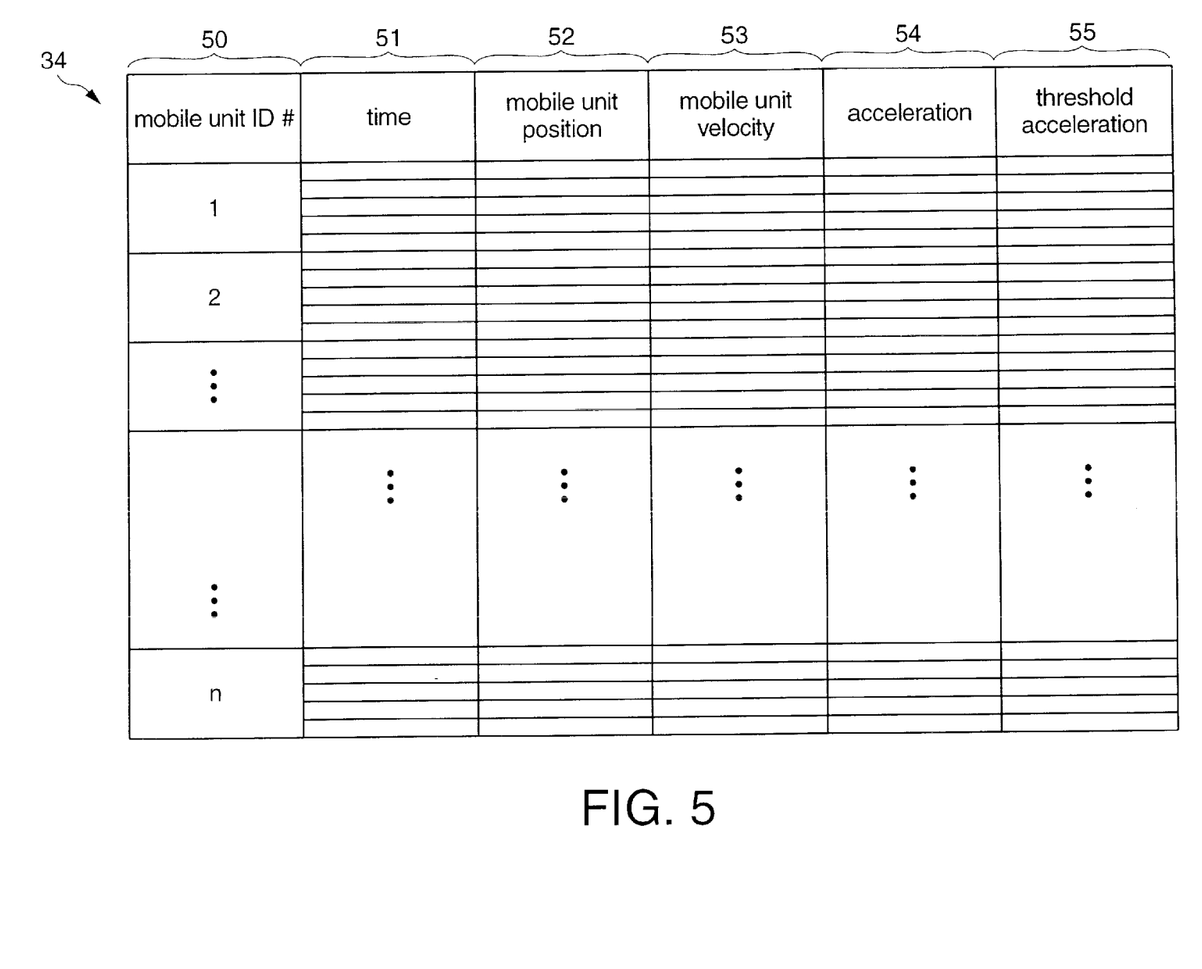
FIG. 5 represents one implementation of position table 34.

FIG. 5 shows an exemplary implementation of position table 34 which contains the position, the velocity, and optionally the acceleration of each mobile unit 10-1 through 10-n. Columns 50 through 55 of position table 34 contain the actual position, velocity, and acceleration of each mobile unit 10-1 through 10-n for a specific duration of time at discrete time intervals. In an embodiment that uses server 6, each mobile unit 101 through 10-n is identified by an identification number in column 50. Column 50, however, is unnecessary for the embodiment of FIG. 4 in which a microprocessor internal to the mobile unit is used instead of a remote server such as server 6. Columns 51, 52, 53, 54, and 55 contain rows that shift up each time a new set of data is added. The oldest set of data in position table 34 becomes deleted every time the most recent set of data is added. As a result, position table 34 stores the data representing the reported position, velocity, and acceleration for mobile units 10-1 through 10-n during the most recent predetermined duration of time. The specific duration may be fixed, for example as 2 minutes, or may be selectable either through monitor unit 8 or through mobile unit 10-1 through 10-n.

The mobile unit positions stored in column 52 of position table 34 are obtained by using either the correction factor method 40 or the delta-pseudo-range method 42. The velocities in column 53 are obtained by dividing the change in position between two consecutive measurements by the time interval between the two consecutive measurements. The acceleration data stored in column 54 are obtained by dividing the velocities of two consecutive rows by the time interval. The threshold values stored in column 55, which depend on various parameters of the mobile units, is obtained from either a separate database (e.g., database 40) or a database internal to server 6 (e.g., database 38).

Figure 6:
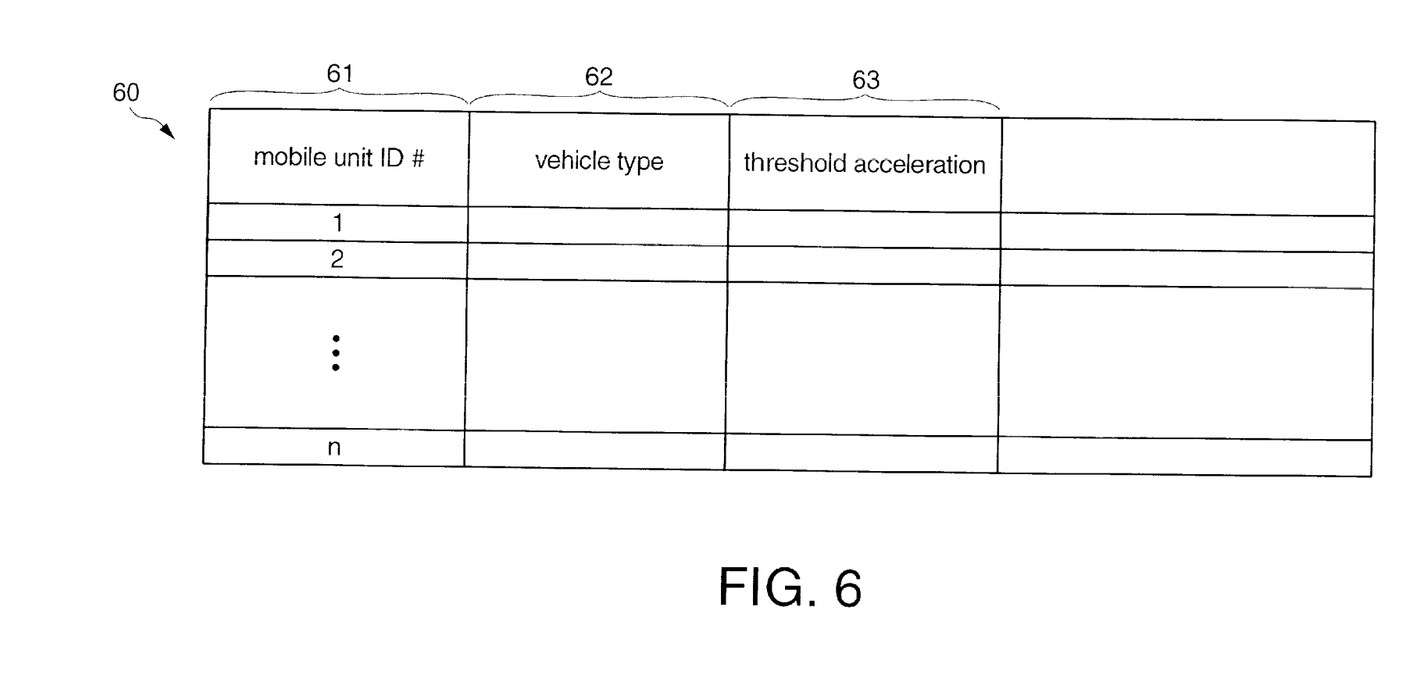
FIG. 6 represents one implementation of threshold value table.

Threshold value table 60 of FIG. 6 is an exemplary table of threshold values. Column 61 of threshold acceleration table 60 stores the same list of mobile unit identification numbers as column 50 of position table 34. Threshold value, as used herein, refers to the highest rate of acceleration possible using the brakes or the accelerator of a motor vehicle. Therefore, an acceleration rate higher than the threshold value implies that an external force, such as a collision, is involved. In column 62, threshold acceleration table 60 stores the vehicle type for each mobile unit 10-1 through 10-n. Vehicle type may be, for example, the make and model of the vehicle, or a number that indicates a specific combination of parameters including but not limited to the vehicle weight, the type and age of the tires on the vehicle, and the type of braking system being used. Road conditions may also be taken into account. Column 63 of threshold acceleration table 60 records the threshold value that corresponds to each vehicle type. In some embodiments, there might be more than one threshold value. For example, there might be a threshold value for a collision, a threshold value for a free fall, and a threshold value for a roll-over. When the acceleration value of a mobile unit matches any of the threshold values, an accident notification is sent.

In some embodiments, the threshold values may not be in a table format. Instead, the threshold values may simply be calculated based on the specific vehicle parameters that are stored in a database (e.g., database 40 shown in FIG. 1). FIG. 1 shows that server 6 has access to database 40. As mentioned above, database 40 may contain threshold acceleration table 60. If threshold value is not stored in a table format, database 40 may contain, for each mobile unit, the parameters necessary for determining the threshold values, A rate of acceleration that is higher than the threshold acceleration is hereinafter referred to as abnormal acceleration. For each mobile unit, position table 34 may continue updating the data only for a limited period of time after detecting an abnormal acceleration. For example, position table 34 may be programmed to record the position, the velocity, and the acceleration data for one minute after the detection of an abnormal acceleration. After a limited period of time, the updating stops and the data remains frozen. The frozen data contains the movement of mobile unit 10-i for a given period of time prior to the collision and a given period of time after the collision. Later, the information about the movement of mobile unit 10-i may help analyze the cause of collision. For example, the frozen data in position table 34 may be replace or supplement the skidmark analysis currently used for accident reports. Mobile unit 10-i may be encased in a protective shell so as to minimize the probability of destruction upon a collision. Position table 34 may be programmed to record the position, the velocity, and the acceleration at a shorter time interval after a detection of an abnormal acceleration to provide more data points for subsequent accident analysis.

Upon detecting an abnormal acceleration, data processing unit sends an accident notification to monitor unit 8. The notification may include text, images, sound, or a combination thereof Optionally, mobile unit 10-i may be coupled to the collision-detection apparatus that deploys the air bags. In that case, server 6 may send a signal to deploy the air bags of mobile unit 10-i upon detecting an abnormal acceleration.

Server 6 may include database 38 and map storage 32. Database 38 may include information concerning, for example, the hospital and the police station nearest mobile unit 10-i, road conditions, and traffic conditions. Storage for database 38 can be implemented using any mass storage media such as hard disks, RAMs, ROMs, CD-ROMs, and magnetic tapes. Perhaps, infrequently updated information (e.g., maps, nearest police station) may be stored on CD-ROMs, while frequently updated information (e.g., traffic conditions) can be stored on RAM.

Figure 7:
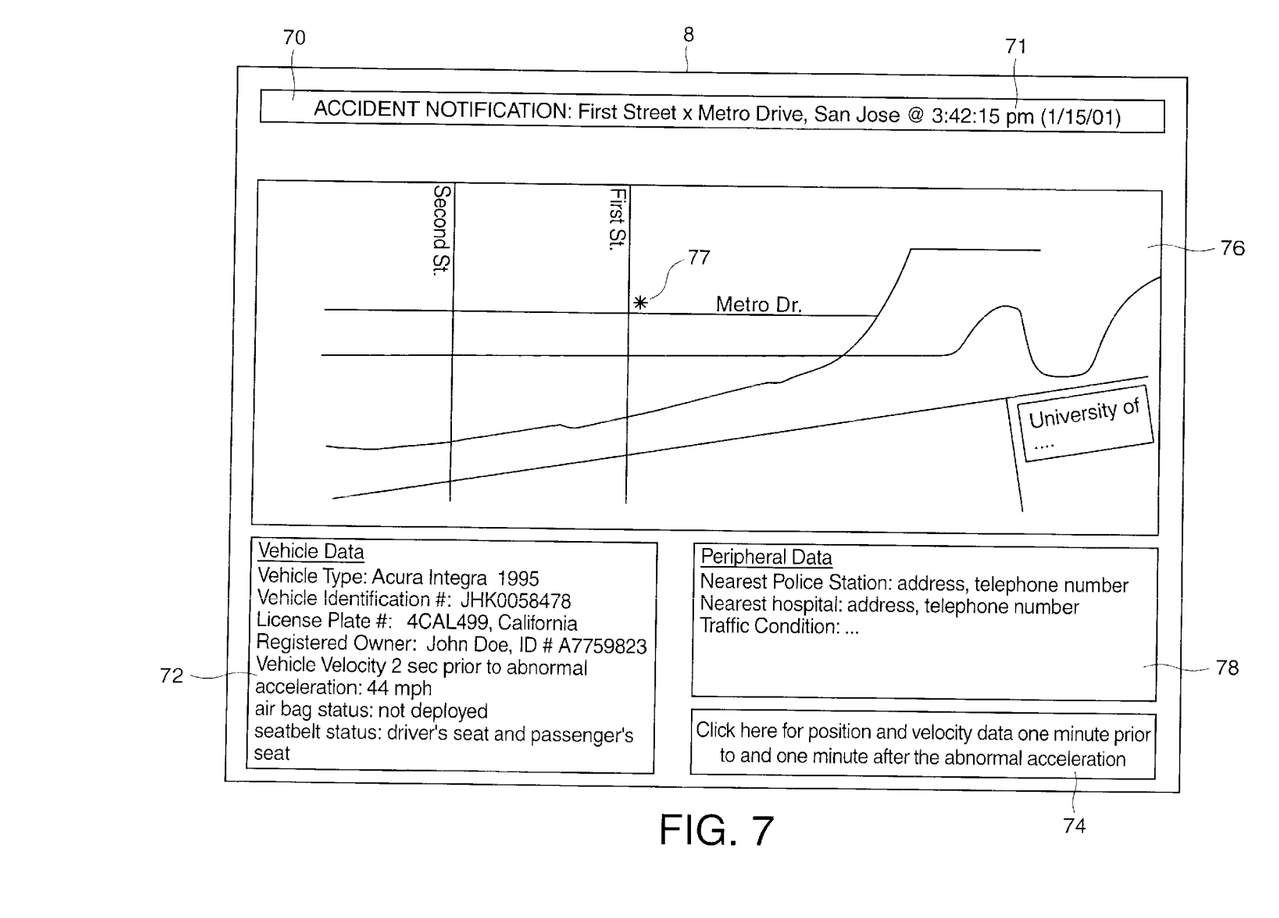
FIG. 7 illustrates one display of an accident notification in a monitor unit according to the present invention.

When server 6 detects an abnormal acceleration, it sends an accident notification to monitor unit 8 through data network 4. Monitor unit 8 may be, for example, a conventional computer with a web browser. An accident notification may involve text, audio, or graphics. In FIG. 7, exemplary accident notification 70 includes sufficient information to allow the operator of monitor unit 8 to estimate the severity of injuries accident victims may have sustained. In fact, server 6 can be programmed to recognize specific movement patterns as a certain type of accident. For example, a certain type of movement of mobile unit 10-i may be recognized as a vehicle roll-over. Similarly, a certain type of acceleration pattern after the first abnormal acceleration may indicate multiple collisions. When the detected change in acceleration fits one of the recognized patterns, the accident type may be included in the accident notification.

Accident notification 70 of FIG. 7 not only provides the time at which abnormal acceleration was detected but also indicates position 77 of mobile unit 10-i superimposed on map 76. In addition, accident notification 70 may include vehicle information 72 such as the velocities of the mobile unit(s) (which is the same as velocities of the vehicles), the vehicle type, and the identification of the owner. The velocities and the positions of the mobile unit may allow an estimate of the severity of injuries to vehicle passengers. If the collision occurred at a high velocity, the police and the nearest hospital may need to be notified. In embodiments having multiple threshold values, accident notification 70 may also state the type of accident, for example a collision or a free fall, based on which threshold value was exceeded. Accident notification 70 may also provide peripheral data 78 concerning the nearest police station and the nearest hospital to expedite the dispatch of police cars or an ambulance. In case more information is necessary, window 74 of accident notification 70 allows monitor unit 8 to retrieve the data in position table 34. Accident notification 70 may also include data on the traffic condition and road condition around the accident site so that any police car or ambulance can take the most efficient route to the accident site. To further expedite the process, monitor unit 8 may be located in a hospital or a police station.

If mobile unit 10-i is coupled to the apparatus that deploys the air bag, the air bag deployment status can be included in accident notification 70. Mobile unit 10-I can be adapted to connect into the vehicle's diagnostic an operational status reporting system so that the operational condition of the vehicle at the time of the accident can be reported. For example, such as system can detect whether any seat belt is being used so that accident notification 70 can include information about whether seatbelts were being used in the vehicle.

Although the present invention is described using the above embodiments, the scope of the invention is not limited by the embodiments provided herein. Numerous variations and modifications are possible within the scope defined by the following claims.

What is claimed is:

1. A method for detecting abnormal activities of a motorized vehicle, said method comprising:

receiving code sequences from global positioning system (GPS) satellites at a mobile unit;

using said code sequences to derive the acceleration of said motorized vehicle;

comparing an absolute value of said acceleration with a threshold value; and sending notification to a third party if the absolute value of said acceleration exceeds said threshold value.

2. The method of claim 1, wherein said code sequences comprise:

the time at which said code sequences are sent.

3. The method of claim 1, wherein said using comprises:

converting said code sequences into positional data;

computing the velocity of said motorized vehicle based on said positional data; and deriving the acceleration of said motorized vehicle based on said velocity.

4. The method of claim 3, further comprising:
transmitting said positional data to a server; and
storing said positional data and said velocity in a database.

5. The method of claim 3, further comprising:
computing a rate of acceleration based on said velocity; and
storing said acceleration in a database.

6. The method of claim 4, wherein said transmitting comprises:
sending data through a wireless communication network.

7. The method of claim 6, wherein said wireless communication network sends said data to a data network.

8. The method of claim 6, wherein said wireless communication network comprising at least one of cellular digital packet data network, code division multiple access network, small message service, conventional data, and voice switching network.

9. The method of claim 7, wherein said data network comprises:
the Internet.

10. The method of claim 7, wherein said data network comprises a telephone network.

11. The method of claim 1, wherein said threshold value depends on various parameters of said motorized vehicle, said parameters comprising:
weight of said motorized vehicle;
type and age of tires; and
type and age of brake pads.

12. The method of claim 1, wherein said threshold value is the fastest change in velocity achievable using the brakes or the accelerator.

13. The method of claim 1, wherein said threshold value indicates that said acceleration is caused by an external factor.

14. The method of claim 1, wherein said threshold value indicates that the cause of said acceleration is at least one of:
collision;
roll-over; or
free fall.

15. The method of claim 4, wherein said database comprises:
a position table comprising:
position of said mobile unit;
velocity of said mobile unit; and
acceleration of said mobile unit;
wherein said position, said velocity, and said acceleration are recorded for a predetermined period of time at a predetermined time interval.

16. The method of claim 15, wherein said predetermined time interval changes when aid acceleration exceeds said threshold value.

17. The method of claim 1, wherein said notification comprises:
seatbelt status indicating the number of seatbelts used in the vehicle containing said mobile unit.

18. The method of claim 1, wherein said notification comprises:
airbag deployment status in the vehicle containing said mobile unit.

19. The method of claim 1, wherein said notification comprises:
a map showing the location of said mobile unit.

20. The method of claim 1, wherein said notification comprises at least one of:
text;
sound; and
graphic images.

21. An accident reporting system comprising:
a data network;
a mobile unit receiving code sequences from global positioning system satellites to derive positional information and transmitting said positional information to said data network;
a server connected to said data network computing the acceleration of said mobile unit based on said positional information and sending an accident notification to said data network if said acceleration exceeds a threshold value; and
a monitor unit receiving said accident notification through said data network.

22. The accident reporting system of claim 21, further comprising:
a database accessible to said server, said database containing said threshold value.

23. The accident reporting system of claim 21, wherein said threshold value is an acceleration value too high to be caused by braking.

24. The accident reporting system of claim 21, wherein said server comprises:
a data processing unit that computes the position of said mobile unit and said acceleration at a predetermined time interval;
a map storage containing maps to be included in said accident notification; and
a position table wherein said actual position, said velocity, and said acceleration are stored.

* * * * *